A. B. Hunt,
Hay Elevator,
No 83,385. Patented Oct. 27, 1868.

Witnesses.
Wm. A. Morgan
G. C. Cotton

Inventor.
A. B. Hunt,
per Munn & Co.

United States Patent Office.

AMOS B. HUNT, OF MATTESON, MICHIGAN.

Letters Patent No. 83,385, dated October 27, 1868.

IMPROVEMENT IN ELEVATOR.

The Schedule referred to in these Letters Patent and making part of the same.

*To all whom it may concern:*

Be it known that I, AMOS B. HUNT, of Matteson, in the county of Branch, and State of Michigan, have invented a new and improved Horse-Power Hay-Elevator; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
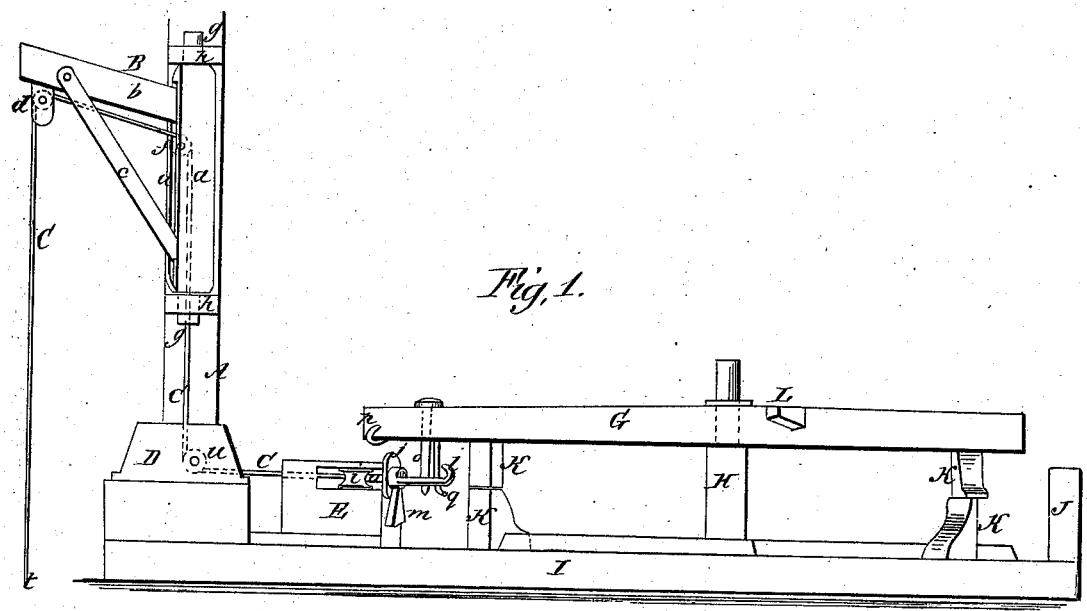
Figure 1 is a side elevation of my improved hay-elevator.
Figure 2:
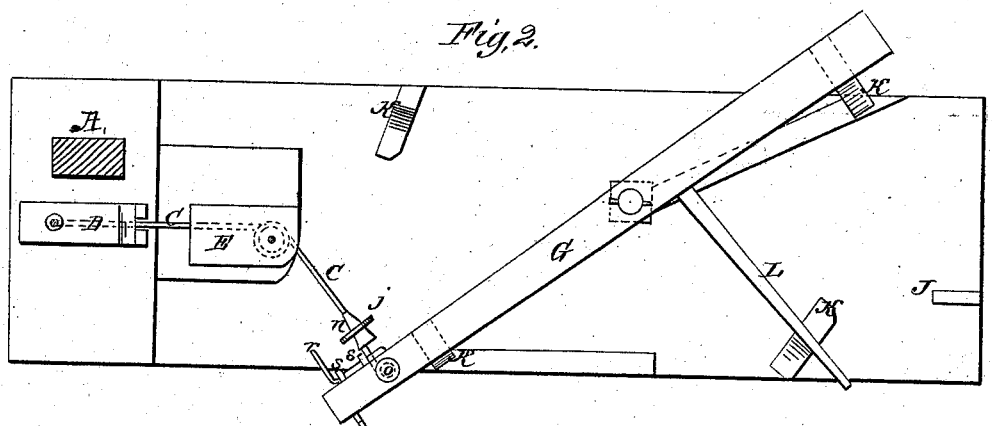
Figure 2 is a top view of the same.
Figure 3:
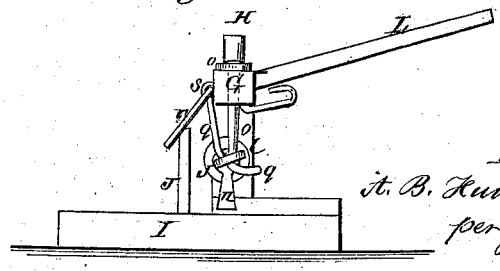
Figure 3 is a detail view of the catch and tripping-devices.

The object of this invention is to provide the means of elevating hay from the wagon, and storing the same in the bay or mow of a barn, (or for lifting hay from the stack, and loading the same on a wagon,) in a rapid and easy manner, with the aid of only two attendants and a horse or other draught-animal.

It consists, in general terms, of a swinging crane and sweep-bar, provided with a lifting-rope, pulleys, and catch, and tripping-devices, together with other devices, perfecting the whole, all of which are hereinafter fully set forth.

In the drawings, A is the crane-post supporting the swinging crane B, which may be constructed in any suitable manner that will permit the lifting-rope C to lead down through its vertical or swinging axis, but is more simply and cheaply formed of two planks, *a a*, affixed together at each end to gudgeon-blocks *g*, thus affording a space between them for the ends of the crane-beam *b* and its brace *c*, which are therein affixed by pins or nails through the said planks *a*.

*d* is a block containing a sheave, and projects downward from the crane-beam, as shown.

Another sheave, *f*, is arranged between the planks *a*, near the inner end of the crane-beam, and the lifting-rope C passes over these two sheaves, and down through a hole in the lower gudgeon-block *g*, as shown, when it passes under a sheave in the block D, and thence through a block, E, containing another sheave, *i*, when it terminates in a spindle, bearing a collar, *j*, hook, *l*, and balance-weight, *m*, as shown.

*h h* are bearing-blocks for the gudgeons *g*. The sweep-bar G revolves on the reduced circular end of a short post, H, affixed to the bed-plank I, or projecting downward through the said bed-plank into the ground.

The length of the plank and the sweep-bar is dependent somewhat upon the height to which the hay must be raised in transferring it to the mow.

The draught-animal is hitched to a hook, *p*, at one end of the sweep-bar, and in passing around the circle, the catch and tripping-mechanism act to pull upon the rope, thus elevating the fork attached to the end of the same.

The loaded fork, while being thus elevated, is brought over the mow by swinging the crane-beam over the mow, and the hay is discharged therefrom by pulling the tripping-line with which horse hay-forks are usually provided.

As soon as the hay is discharged, the crane-beam is swung back over the wagon again, and by that time the draught-animal will have made one-half revolution, when the tripping-devices, with which the sweep-bar is provided, will be made to detach the rope C and let the fork descend upon the load in the wagon, when the attendant upon the load will again fill the fork for a repetition of the same operation.

The catch and tripping-mechanism will now be described in detail.

The spindle *n* is attached to the end of the rope C by means of an eye-splice, or in any suitable manner.

The hook *l* is formed with a swivel-eye, which fits on the end of the spindle, and is held from slipping off by a collar or head formed on the said spindle, so that the hook may turn loosely on the spindle, to assume the proper position with reference to the pin *o* on the sweep-bar which encounters it.

The hook is kept to the proper position mentioned by, first, the collar *j*, which limits its horizontal movement at the right point, by encountering the block E, and second, the balance-weight *m*, forming part of the swivel-eye, and projecting downward therefrom, this balance-weight being arranged to bring the open part of the hook horizontal, and towards the pin *o*, on the sweep-bar, when the latter is moving in the proper direction.

*q* are the tripping-devices, and consist in a wire, bent as shown, to form a trigger, *r*, and tripper, *q*, and attached to the side of the sweep-bar by two staples, *s s*, so that the tripper and trigger will vibrate when actuated to do so.

J is a short post or projection from the plank I, so arranged that the trigger *r* will encounter it as the sweep-bar passes, and thereby cause the tripper *q* to dislodge the hook *l* from the pin *o*.

This operation will be more clearly understood by setting forth the movements of the catch and tripping devices in detail, though it must be borne in mind that the liberation of the rope is to permit the fork to descend to the load on the wagon, and not to discharge the hay into the mow.

We will first suppose that the fork, at the end, *t*, of the rope, is on the load, and filled with hay. The crane will of course be then swung away from the mow.

The sweep-bar, in revolving, brings its pin *o* against the hook *l*, which, catching on the said pin, forms a connection of the rope and sweep-bar. As the sweep-bar is driven around, the fork and its charge of hay are lifted from the load to the proper height.

The crane is then swung, by one of the attendants, over the mow, and the hay discharged therein. The crane is then swung back, to bring the fork over the wagon, at which time the sweep-bar will have made one-half revolution on its gudgeon, and the tripper *q* will have changed its relative position with respect to the hook $l$, so that when the trigger $r$ encounters the stake or post J, the tripper will be actuated against the hook, and being curved, as shown, will operate to bear down the hook and dislodge it from the pin $o$.

The weight of the fork will draw the hook back toward the block E, in revolving, for a repetition of the operation. While the sweep-bar is making the remaining half of its revolution, the attendant on the load will have time to again charge the fork, set it for tripping, and pull down on the rope, to haul the collar snugly up to the block E, so that the pin $o$ will strike it.

In practice, the crane-post A may be so inclined that the crane will swing back over the mow of its own accord, when it can be swung over the wagon again by means of the fork-tripping line, held by the attendant on the wagon.

K K K K are blocks on the sweep-bar and plank I, for the purpose of steadying the former, and keeping it level as it passes the hook and tripping-post J, so that the catch and tripping-devices shall not fail to act.

The sheave $i$ in the block E serves to prevent the friction of the rope against the block, as the former is deflected.

When used for unloading, the stake construction and operation will be substantially the same as herein set forth.

The sheave in the block D is shown dotted, at $u$.

L is the loading-bar.

Thus, by my invention, hay may be discharged from a wagon into the mow, or from the stack into the wagon, in a rapid and easy manner.

Other devices for catching and tripping the rope may be employed, and I desire to be understood as not limiting myself to the use of the precise devices for that purposes, as set forth above.

Having thus described my invention,

I claim as new, and desire to secure by Letters Patent—

1. The crane B, crane-post A, sheaves or pulleys arranged at the points $d$, $f$, $u$, and $i$, rope or cord C, arranged on the sheaves, and passing down through the axis of the crane, in combination with a sweep-bar, G, all substantially as set forth.

2. The swivel-hook $l$, and its accessory parts, $m$, $j$, $n$, in combination with the pin $o$ and tripping-device $r$ $q$, all substantially as herein set forth.

3. The crane B, when constructed of planks and parts $a$ $a$, $g$ $g$, $c$, $b$, $d$, substantially as described, in combination with the crane-post A, bearing-blocks $h$ $h$, sweep-bar G, cord or rope C, and pulleys at the points $d$, $f$, $u$, and $i$, all as set forth.

AMOS B. HUNT.

Witnesses:
C. J. KEYES,
W. H. COMPTON.